United States Patent

[11] 3,594,048

[72] Inventors Otto Körner;
    Rolf Müller, both of Remscheid, Germany
[21] Appl. No. 827,544
[22] Filed May 26, 1969
[45] Patented July 20, 1971
[73] Assignee Diehl
    Nurnberg, Germany
[32] Priority June 1, 1968
[33] Germany
[31] P 17 55 630.8

[54] TRACK LINK CONNECTOR
    1 Claim, 2 Drawing Figs.
[52] U.S. Cl. .................................................. 305/58
[51] Int. Cl. ............................................. B62d 55/28
[50] Field of Search ........................................ 305/36, 58, 59

[56]          References Cited
         UNITED STATES PATENTS
2,957,731  10/1960  Backhaus ..................... 305/58 UX
3,227,586   1/1966  Spencer ....................... 148/46
3,340,717   9/1967  Korner ......................... 305/58 UX Primary Examiner—Richard J. Johnson
Attorney—Walter Becker ABSTRACT: A track chain connecting link, especially clamping connector, which comprises a slot interconnecting the two chain bolt bearing eyes and extending along the plane passing through the two central axes of the bearing eyes while extending over the entire width of the connecting link which slot is compressible by means of a clamping screw, the track link connector consisting of steel being induction hardened at the circumference within the area of the interengaging portions of the driving rim approximately circularly over a depth of a few millimeters and approximately by 45 HRc so that the surface hardness remains maintained at least by 50 HRc.

PATENTED JUL 20 1971 3,594,048

INVENTOR.
OTTO KÖRNER AND
ROLF MÜLLER

BY

TRACK LINK CONNECTOR

The present invention relates to a track link connecting member, especially a clamping connector, which has a slot interconnecting the bearing eyes for the chain bolts and extending approximately along the plane passing through the central axes of said bearing eyes while extending over the total width of the connecting member. More specifically, the present invention concerns a track link connector in which the said slot can be compressed by a clamping screw against the spring effect or thrust of the connecting member.

With track chains it is highly disadvantageous that in the course of time the teeth of the driving rim work themselves into the connector which is designed as a follower. For purposes of controlling the wear and for indicating the maximum limit of admissibility, it is known to provide the circumference of the track link connecting member with markings in the form of depressions and to provide these markings which may be colored, at the admissible limit of wear in the area where the connecting member is engaged by the driving sprocket. In order to eliminate the drawbacks inherent to the wear as far as possible, it is also known to keep those sides of the track link follower which face the driving sprockets, during the movement of the track chain onto the driving sprockets, at a certain distance from the bottom of the teeth of the driving sprockets. This is done by providing layers enveloping the wheel drum and/or by an inner supporting surface of the individual track chain links which surface protrudes beyond the limit line of the follower which faces the driving wheels.

The first mentioned solution indicates the degree of wear whereas the second indicated solution decreases the drawbacks inherent to wear. However, neither one of these solutions eliminates the source of error, namely wear itself.

It is, therefore, an object of the present invention to provide a track chain connecting link which will overcome the above-mentioned drawbacks.

It is another object of this invention to provide a connecting link as set forth in the preceding paragraph, which will reduce the wear to a minimum or even eliminate it all together.

These and other objects and advantages of the invention will appear more clearly from the following specification in connection with the accompanying drawing, in which.

The above-outlined objects have been realized according to the present invention by hardening the track link connecting member which consists of steel at the circumference of the connecting member within the area of engagement with the driving sprocket. The hardening is preferably effected by induction hardening over an approximately circular area up to a maximum depth of a few millimeters to approximately 45 HRc so that a surface hardness of at least 50 HRc will be obtained.

In this way the hardening zone is, in conformity with the highest stress occuring in said zone, preferably so selected that its central axis together with the axis of the clamping screw defines an angle of from 30° to 45°. The depth of the hardening increases from the center toward the marginal area in a preferably uniform manner.

Figure 1:
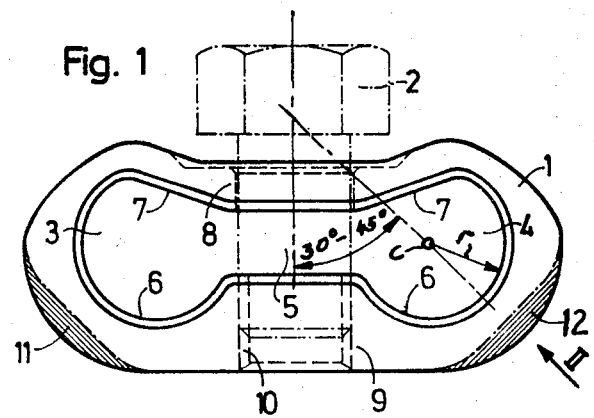
FIG. 1 is a side view of a clamping connector according to the invention with partially hardened areas.
Figure 2:
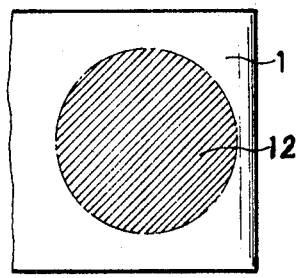
FIG. 2 is a top view of the hardened zone as seen in the direction of the arrow II.

Referring now to the drawing in detail, the track link connecting member according to FIG. 1 comprises a main body 1 of steel and a clamping member 2. Two chain bolt bearing eyes 3 and 4 in the main body 1 are over the entire axial width of the connector interconnected by a slot 5. The bearing eyes 3 and 4 have the shape of segments 6 of a circle with a straight engaging side 7. While an upper part 8 of the connector main body is countersunk, a thick lower transverse member 9 is provided with inner thread 10 for the clamping screw 2.

The connecting links of connector track chains form driving transmission elements from the driving sprocket to the chain. The outer lower sides mesh with the driving sprocket which means remain in permanent frictional contact therewith. The teeth of the driving sprocket will thus not beat into the connector main body 1. In conformity with the present invention, the surface of the connecting link 1 is at the areas designated with the reference numeral 11 induction hardened and at the surface at least to from 50 to 55 HRc. In the center the hardening partially extends, to a depth of a plurality of millimeters. At a depth of 3 millimeters locally, it should still amount to approximately from 40 to 45. As has been indicated in FIG. 1 in connection with the inner limit of a hardening course, the hardening depth, starting from the center, decreases toward the marginal areas. The central axes of the substantially circular hardening zones 11, 12 are relative to the axis of the clamping screw 2 offset toward the left or the right from 30° to 45°, said axes passing through the center C of the circle of the radius $r$.

It is, of course, to be understood that the present invention is, by no means, limited to the specific example shown in the drawing but also comprises any modifications within the scope of the appended claims.

What we claim is:

1. A track chain connecting member forming a link for engagement with a driving sprocket, comprising: a main longitudinal body having rounded sprocket engaging end portions, two bearing eyes spaced longitudinally and connected by a transverse slot through said body, clamping screw means transverse to said link and slot and operable to contract said slot, said track chain connecting member being partially surface hardened locally at the rounded sprocket engaging end portions, each hardening zone including an area having a central axis extending at an angle of 30° to 45° to the axis of said clamping screw means, each of said hardening zones having a depth of a few millimeters along said axis and decreasing toward its marginal areas with a hardness of 45 HRc at said depth and a surface hardness of at least 50 HRc.